United States Patent
Hua et al.

(10) Patent No.: US 11,361,138 B2
(45) Date of Patent: Jun. 14, 2022

(54) OVER-THE-AIR HARDWARE UPDATE

(71) Applicant: Shenzhen Chipuller Chip Technology Co., LTD, Shenzhen (CN)

(72) Inventors: Hao Hua, Foster City, CA (US); Jawad Nasrullah, Palo Alto, CA (US)

(73) Assignee: Shenzhen Chipuller Chip Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/320,462

(22) PCT Filed: Aug. 9, 2017

(86) PCT No.: PCT/US2017/046165
§ 371 (c)(1),
(2) Date: Jan. 24, 2019

(87) PCT Pub. No.: WO2018/031695
PCT Pub. Date: Feb. 15, 2018

(65) Prior Publication Data
US 2020/0026815 A1    Jan. 23, 2020

Related U.S. Application Data

(60) Provisional application No. 62/372,972, filed on Aug. 10, 2016.

(51) Int. Cl.
*G06F 30/30*      (2020.01)
*G06F 30/39*      (2020.01)
(Continued)

(52) U.S. Cl.
CPC .......... *G06F 30/39* (2020.01); *G06F 2111/02* (2020.01); *G06F 2117/08* (2020.01)

(58) Field of Classification Search
CPC .. G06F 30/39; G06F 2111/02; G06F 2117/08; H04L 29/08; H04L 67/34; H04W 4/50
See application file for complete search history.

(56) References Cited

U.S. PATENT DOCUMENTS 5,821,772 A * 10/1998 Ong ................. H03K 19/17748
326/38
6,573,748 B1 * 6/2003 Trimberger ...... H03K 19/17744
326/38

(Continued)

OTHER PUBLICATIONS

International Preliminary Report on Patentability dated Feb. 21, 2019 for PCT Patent Application No. PCT/US2017/046165.

(Continued)

*Primary Examiner* — Jack Chiang
*Assistant Examiner* — Brandon Bowers
(74) *Attorney, Agent, or Firm* — Mughal IP P.C.

(57) ABSTRACT

Described is an apparatus for supporting Over-The-Air Hardware Updates comprising a first circuitry, a second circuitry, and a third circuitry. The first circuitry may be operable to be fastened and electrically coupled in one or more regions to one or more respectively corresponding semiconductor dies. The second circuitry may be operable to configure the one or more regions of the first circuitry. The third circuitry may be operable to provide a set of wirelessly-received configuration instructions to the second circuitry.

23 Claims, 12 Drawing Sheets

(51) Int. Cl.
*G06F 111/02* (2020.01)
*G06F 117/08* (2020.01)

(56) References Cited

U.S. PATENT DOCUMENTS

| | | | | |
|---|---|---|---|---|
| 7,734,858 | B2 * | 6/2010 | Loffink | G06F 13/4022 |
| | | | | 710/313 |
| 7,945,827 | B1 * | 5/2011 | Briggs | G01R 31/318563 |
| | | | | 714/724 |
| 8,601,306 | B1 * | 12/2013 | Lu | G06F 21/72 |
| | | | | 713/500 |
| 9,106,229 | B1 | 8/2015 | Hutton et al. | |
| 2007/0010285 | A1 | 1/2007 | Schmidt | |
| 2008/0296697 | A1 * | 12/2008 | Hsu | H01L 23/645 |
| | | | | 257/379 |
| 2012/0187578 | A1 | 7/2012 | Li | |
| 2015/0323589 | A1 | 11/2015 | Wang et al. | |
| 2016/0196364 | A1 | 7/2016 | Cumings | |
| 2016/0364223 | A1 * | 12/2016 | Vandikas | H04W 4/50 |

OTHER PUBLICATIONS

International Search Report & Written Opinion dated Nov. 15, 2017 for PCT Patent Application No. PCT/US17/46165.

* cited by examiner

OVER-THE-AIR HARDWARE UPDATE

CLAIM OF PRIORITY

This application is a National Stage Entry of, and claims priority to, PCT Application No. PCT/US17/46165, filed 9 Aug. 2017 and titled "OVER-THE-AIR HARDWARE UPDATE", and claims priority to U.S. Provisional Patent Application Ser. No. 62/372,972, filed on Aug. 10, 2016, titled "A Method for Over-the-Air Hardware Update (OTAHU)", both of which are incorporated by reference in their entireties for all purposes.

BACKGROUND

Design of systems for various hardware applications may depend upon various factors. System design may require development time and test time, for example, and markets being designed for may themselves be fragmented. In turn, these factors may impose monetary costs and may impact time to market for the systems being designed, and may place stress on system design teams and software development teams.

Design and manufacture of a prototype Printed Circuit Board (PCB) may take a few weeks, for example, and system bring-up and testing of basic functionality may take another few weeks. Results from testing may lead to further iterations of the design and manufacturing cycles, with each iteration corresponding with additional effort. High confidence in the system design might result from multiple iterations.

Moreover, hardware faults or inefficient hardware performance may be detected at a late stage of a design cycle. If discovered late enough, significant numbers of devices may have already been manufactured, and may thereafter be subject to a product recall.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
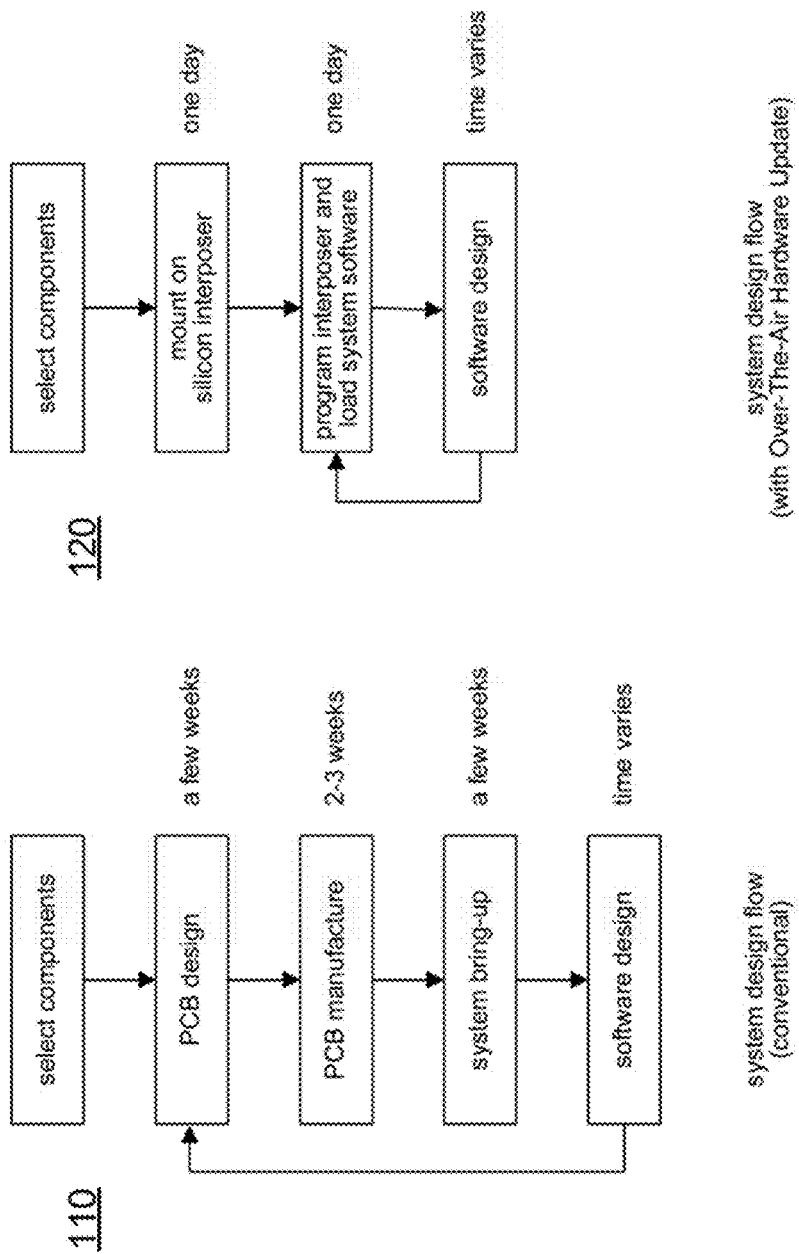
FIG. 1 illustrates system design flows including an Over-The-Air Hardware Update (OTAHU) system design flow, in accordance with some embodiments of the disclosure.

Design and manufacture of systems may require a number of iterations of a design and manufacturing cycle, which may impose monetary costs and may impact time to market for the systems being designed. Meanwhile, in various markets such as the markets for Internet-of-Things (IoT) applications and wearable applications, development time may be in short supply. Moreover, fragmentation of the markets may impose additional requirements upon the systems being designed, and design and optimization of each device may not be feasible. Fast execution may therefore be important for successful product development.

Discussed herein are mechanisms and methods for system design and manufacture incorporating Over-The-Air Hardware Update (OTAHU). These mechanisms and methods may reduce development time and may reduce test time for various products, which may include IoT applications and wearable applications.

In various embodiments, systems may be based on programmable silicon interposers in such a manner that system hardware may be mass-manufactured and tested at an early time, and a detailed design may be upgraded or programmed at a later time. An OTAHU design cycle might not involve early design and optimization of end products. Instead, an OTAHU design cycle may be amenable to mass-manufacture and programming with basic functionalities at an early time with full hardware functionality being programmable at a later time. This may reduce or eliminate some portion of time used for designing hardware, and may significantly reduce system cost by facilitating the use of standard modules and standard assembly processes. An OTAHU design cycle may thus advantageously result in shorter time-to-market, reduced costs, increased Intellectual Property (IP) protection, and design flexibility.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals or wires carrying signals may be represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

For systems with general electronic modules, radio-based or Over-the-Air (OTA) update of system hardware connectivity may significantly reduce system design and manufacture costs as well as time-to-market. Mechanisms and methods incorporating OTAHU may also provide greater flexibility for fragmented markets, such as the IoT market and the wearable market. Pre-manufactured standard electronics modules may be programmed with various types of functionality supported by the underlying hardware. OTAHU may also significantly reduce the barriers to entry for IoT system and software developers. For a generic IoT device, OTAHU technology may reduce or eliminate the need for large electrical design teams.

OTAHU firmware and/or software may be transferred over a radio channel, such as a Bluetooth Low Energy (BLE) channel, and may be programmed into a silicon interposer through a micro-controller or a processor. If a hardware problem is found at a later stage of the design cycle, or when a reconfiguration of the design is desired, an OTA hardware update may be employed, which may advantageously avoid scrapping of already-manufactured products, and may even avoid a product recall.

FIG. 1 illustrates system design flows including an Over-The-Air Hardware Update (OTAHU) system design flow, in accordance with some embodiments of the disclosure. A first system design flow 110, which may be a conventional design flow, may begin with a selection of components, and may proceed to PCB design (which may take a few weeks) and manufacturing of the PCB design (which may take two to three weeks). This may be followed by system bring-up (which may take a few weeks), then software design (which may take a variable amount of time). If results from testing suggest a need for design changes, the cycle may begin again with additional PCB design. Any given design may undergo multiple iterations of first system design flow 110.

For example, in a conventional system design flow (such as first system design flow 110), system engineers may design a system schematic, design a system layout, and validate IOs. This design phase usually takes a few weeks to complete. The layout may then be sent out for manufacture, which may take another two weeks to finish. After the system has been manufactured, engineers may bring up the system, which may take over a week. Then software development may start. If a bug is found, another iteration of the system design cycle may begin. If the bug blocks key software, the whole development process may halt for another few months.

In comparison, a second system design flow 120, which may incorporate OTAHU mechanisms and methods as discussed herein, may begin with selection of components, and may proceed to mounting chiplets on a silicon interposer (which may take one day). In various embodiments, the chiplets may be, or may include, semiconductor dies, integrated circuits, and/or semiconductor chips. For various embodiments, the interposer may be, or may include, an integrated circuit. The chiplets may have smaller footprints (e.g., smaller x-dimensions and y-dimensions) than the interposer, and in various embodiments, multiple chiplets may fit within the footprint of the interposer. The interposer may then be programmed and system software loaded (which may take one day), which may be followed by software design (which may take a variable amount of time). In contrast with first system design flow 110, if results from testing suggest a need for design changes, the cycle may merely return to programming the interposer and loading system software. In this way, portions of first system design flow 110 that may take many weeks may be replaced by portions of second system design flow 120 that may take days.

A standard electronics module may accordingly be pre-manufactured to save hardware design time, and OTAHU may eliminate the need to re-manufacture a PCB if a hardware connectivity bug is found. As a result, development time may be reduced from months to weeks.

So, for example, once a programmable silicon interposer has been manufactured, users may merely need to mount one or more chiplets on the interposer, which may take a week. After that, the system schematic can be downloaded to the interposer through an OTA hardware update. The entire system hardware design phase may thus extend over approximately a week. Even when a bug blocks key software, the development process might only halt for a few days, instead of a few months.

Figure 2:
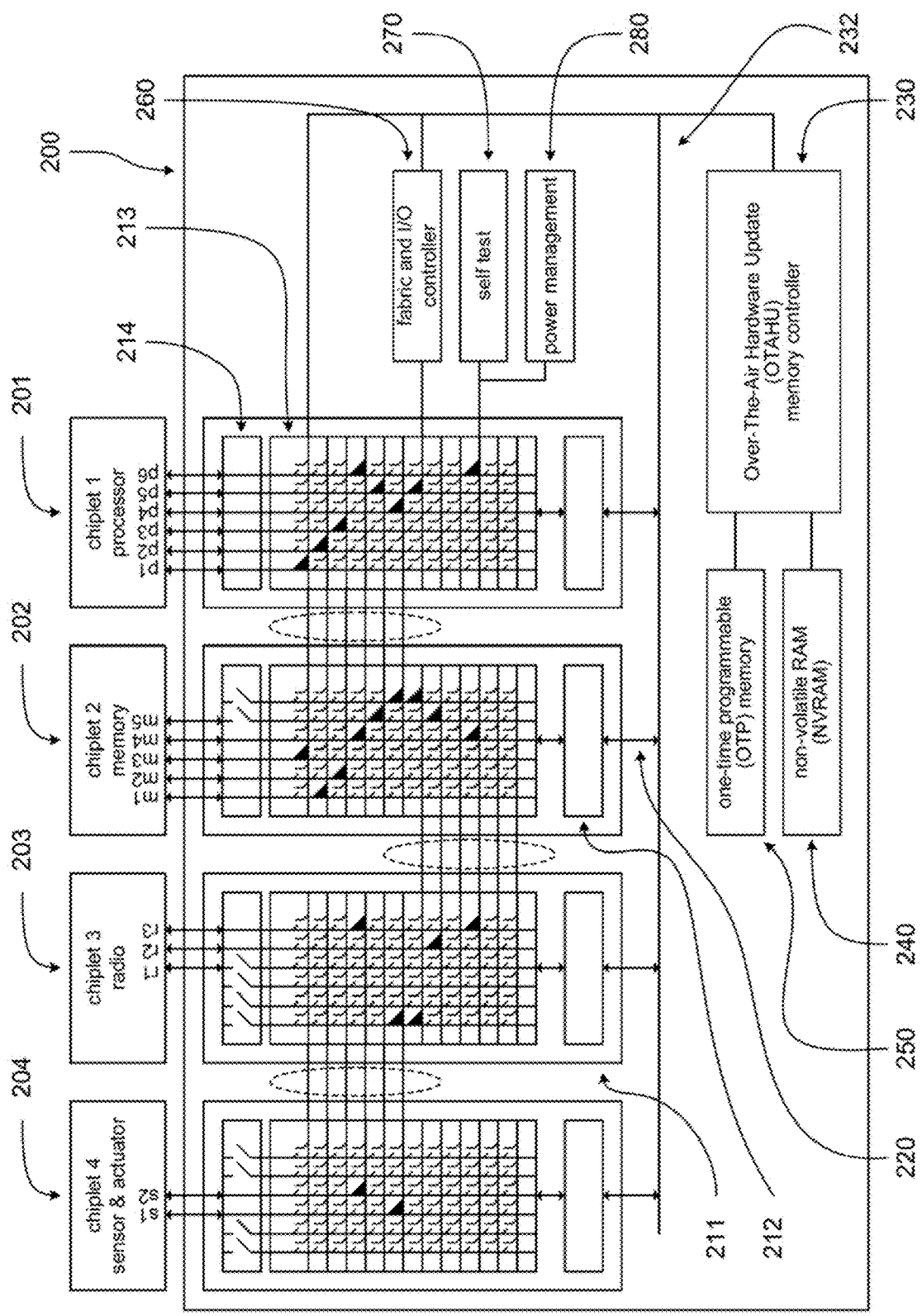
FIG. 2 illustrates a silicon interposer comprising OTAHU mechanisms, in accordance with some embodiments of the disclosure.

FIG. 2 illustrates a silicon interposer comprising OTAHU mechanisms, in accordance with some embodiments of the disclosure. A silicon interposer 200 may incorporate various OTAHU mechanisms. Silicon interposer 200 may comprise a substrate having one or more connection boxes 211. A connection box 211 may comprise a switch control circuitry 212 (which may include field-programmable configuration bits for switch control), a substrate region 213 (which may include cross-bar switches), and a connection switch circuitry 214.

Silicon interposer 200 may also comprise one or more configuration port circuitries 220 (which may respectively correspond to the one or more connection boxes 211), an OTAHU controller 230, a Non-Volatile Random Access Memory (NVRAM) 240, and a One-Time Programmable (OTP) memory 250 (e.g., a Read-Only Memory (ROM)). Silicon interposer 200 may furthermore comprise a fabric and input/output (I/O) controller circuitry 260, a self-test circuitry 270 (which in some embodiments may perform silicon testing), and a power management circuitry 280. OTAHU controller 230 may be coupled via a configuration bus 232 to the one or more configuration port circuitries 220.

In various embodiments, silicon interposer 200 may provide a substrate to make electrical connection to and between one or more chiplets (e.g., according to a design schematic). For example, silicon interposer 200 may be coupled to a first chiplet 201 (which may comprise a processor circuitry), a second chiplet 202 (which may comprise a memory circuitry), a third chiplet 203 (which may comprise a radio circuitry and/or an antenna), and/or a fourth chiplet 204 (which may comprise a sensor circuitry and/or an actuator circuitry). The substrate of silicon interposer 200 may be electrically connected to the one or more chiplets by connections established by connection boxes 211.

OTAHU controller 230, NVRAM 240, and OTP memory 250 may be parts of a memory system and controller infrastructure that work together to configure the system through programming of connection boxes 211. In turn, connection boxes 211 may comprise field-programmable switch control circuitries 212 (which may store configuration information) and cross-bar switches (e.g., cross-bar switches of substrate regions 213). This architecture may advantageously facilitate pre-manufacture of a silicon interposer in large quantities and/or at low cost, and may also advantageously enhance system design flexibility for IoT and/or wearable developers to configure systems in accordance with various application parameters.

OTAHU controller 230 may advantageously enable OTA hardware updates to re-program system hardware configurations. OTP memory 250 may store configuration instructions installed at manufacturing time. In contrast, NVRAM 240 may store configuration instructions received in the field. (In various embodiments, NVRAM 240 may comprise an embedded NVRAM, an external NVRAM, or a combination of the two.)

In various embodiments, an apparatus may comprise a first circuitry (which may be a substrate of silicon interposer 200), a second circuitry (which may be a configuration port circuitry 220), and a third circuitry (which may be OTAHU controller 230). The first circuitry may be operable to be fastened and electrically coupled in one or more regions (which may be regions 213 of the substrate of silicon interposer 200) to one or more respectively corresponding semiconductor dies (which may be chiplets such as first chiplet 201, second chiplet 202, third chiplet 203, and/or fourth chiplet 204). The second circuitry may be operable to configure regions 213. The third circuitry may be operable to provide a set of wirelessly-received configuration instructions to the second circuitry.

In some embodiments, the set of wirelessly-received configuration instructions may include a size indicator, an end indicator, or both. Some embodiments may comprise the one or more semiconductor dies fastened and electrically connected to the one or more regions. The one or more semiconductor dies may include at least one of a processor circuitry (e.g., in first chiplet 201), a memory circuitry (e.g., in second chiplet 202), and a radio circuitry (e.g., in third chiplet 203).

Some embodiments may comprise a fourth circuitry (which may be NVRAM 240), which may have a non-volatile reprogrammable memory for storing the set of wirelessly-received configuration instructions. The fourth circuitry may be operable to provide the set of wirelessly-received configuration instructions to the third circuitry. For some embodiments, part or all of NVRAM 240 may comprise a semiconductor die (e.g., a chiplet) fastened and electrically connected to regions 213.

Some embodiments may comprise a fifth circuitry (which may be OTP memory 250) having a read-only memory for storing a set of factory-installed configuration instructions. The fifth circuitry may be operable to provide the set of factory-installed configuration instructions to the third circuitry.

Some embodiments may comprise an antenna and/or a radio circuitry (which may include a radio circuitry of third chiplet 203) coupled to the third circuitry. The radio circuitry may be operable to provide the set of wirelessly-received configuration instructions. Various embodiments may comprise at least one of a fabric controller circuitry and/or an I/O controller circuitry (which may be fabric and I/O controller circuitry 260), a self-test circuitry (which may be self-test circuitry 270), and a power management circuitry (which may be power management circuitry 280).

In various embodiments, an apparatus may comprise a first circuitry (which may be the substrate of silicon interposer 200), a second circuitry (which may be a configuration port circuitry 220), a third circuitry (which may be OTAHU controller 230), and a fourth circuitry (which may be NVRAM 240). The first circuitry may be operable to be mounted against one or more semiconductor dies (which may be chiplets such as first chiplet 201, second chiplet 202, third chiplet 203, and/or fourth chiplet 204) in one or more respectively corresponding regions (which may be regions 213 of the substrate of silicon interposer 200). The second circuitry may be operable to configure at least one of the one or more regions of the first circuitry. The third circuitry may be operable to provide a set of configuration instructions to the second circuitry. The fourth circuitry may have a non-volatile reprogrammable memory for storing the set of configuration instructions. The apparatus may also comprise an interface operable to receive the set of configuration instructions from a radio circuitry (which may be a radio circuitry of third chiplet 203). The set of configuration instructions may include a size indicator, an end indicator, or both.

Some embodiments may comprise the one or more semiconductor dies mounted against the one or more regions. In some embodiments, the one or more semiconductor dies may include at least one of a processor circuitry (e.g., in first chiplet 201), a memory circuitry (e.g., in second chiplet 202), and the radio circuitry (e.g., in third chiplet 203).

For some embodiments, a semiconductor die (e.g., a chiplet) mounted against one of the one or more regions may comprise the fourth circuitry. Some embodiments may comprise a fifth circuitry (which may be OTM memory 250) having a read-only memory for storing a set of factory-installed configuration instructions. Various embodiments may comprise at least one of a fabric controller circuitry and/or an I/O controller circuitry (which may be fabric and I/O controller circuitry 260), a self-test circuitry (which may be self-test circuitry 270), and a power management circuitry (which may be power management circuitry 280).

Figure 3:
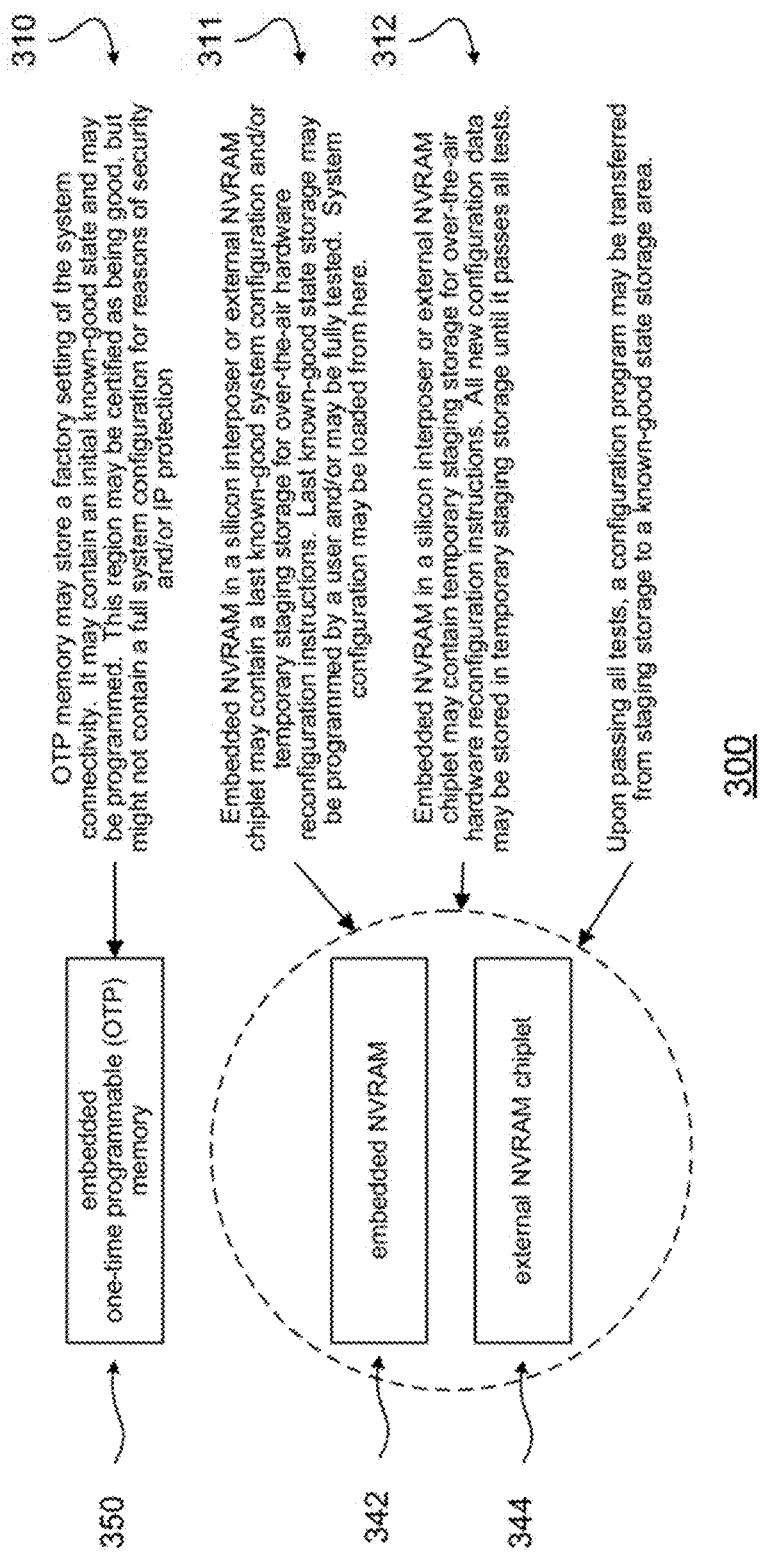
FIG. 3 illustrates software and physical storage schemes in memory systems for system configurations, in accordance with some embodiments of the disclosure.

FIG. 3 illustrates software and physical storage schemes in memory systems for system configurations, in accordance with some embodiments of the disclosure. A scenario 300 may comprise an OTP memory 350 (which may be an embedded memory of a silicon interposer), as well as an embedded NVRAM 342 and/or an external NVRAM 344 (e.g., an NVRAM of a chiplet).

OTP memory 350 may contain a factory-setting system configuration 310 for a silicon interposer according to a target application. In some embodiments, OTP memory 350 may include an NVRAM, and may also include logic and/or circuitry to render a section of the NVRAM unwriteable. Factory-setting system configuration 310 may merely contain configuration instructions pertaining to connections enabling minimum operation, such as connections related to a processor, a radio circuitry, and/or an NVRAM.

A last known-good system configuration 311 may be stored in either embedded NVRAM 342 or external NVRAM 344. Last known-good system configuration 311 may contain configuration instructions pertaining to connections enabling a most recent verified and/or validated system configuration. Last known-good system configuration 311 may be left empty at product manufacture time for customers to program, which may advantageously maximize protection of customers' IP. Both embedded NVRAM 342 and external NVRAM 344 may be encrypted, which may advantageously further enhance security.

A system configuration temporary staging area 312 may prevent a working system configuration from corruption. System configuration temporary staging area 312 may contain configuration instructions pertaining to connections enabling a configuration still under test. System configuration temporary staging area 312 may also contain test code. Once an OTA update is done, system configuration temporary staging area 312 may be marked as valid, and a subsequent reboot of the system may then continue on test.

Figure 4:
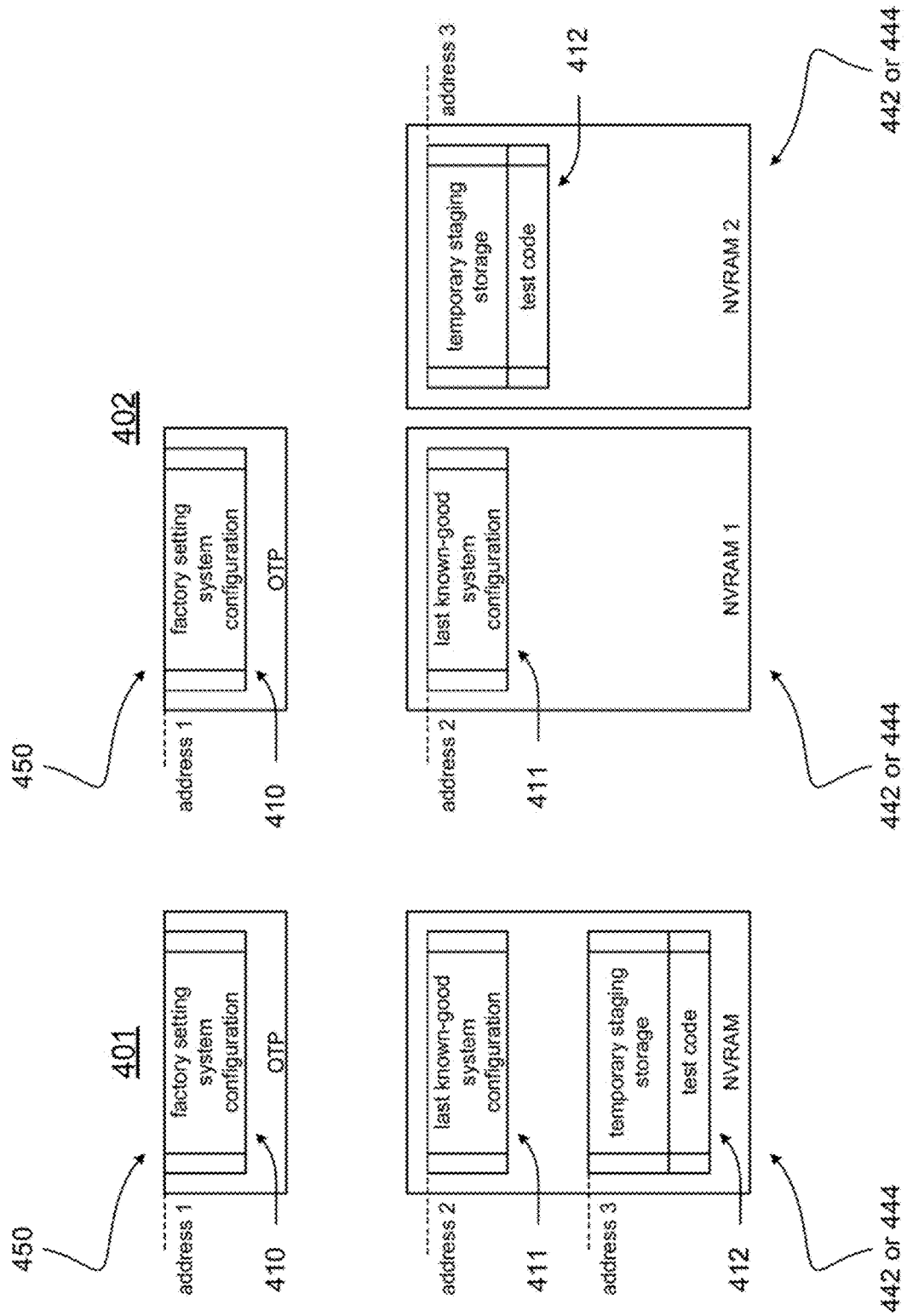
FIG. 4 illustrates memory maps of system configuration storage in memory systems, in accordance with some embodiments of the disclosure.

FIG. 4 illustrates memory maps of system configuration storage in memory systems, in accordance with some embodiments of the disclosure. A first scenario 401 and a second scenario 402 may each comprise an OTP memory 450, an embedded NVRAM 442, and/or an external NVRAM 444. OTP memory 450 may store a factory-setting system configuration 410. Embedded NVRAM 442 and/or external NVRAM 444 may store a last known-good system configuration 411 and/or a system configuration temporary staging area 412.

Factory-setting system configuration 410 may start at an address 1. Last known-good system configuration 411 may start at an address 2. System configuration temporary staging area 412 (which may include OTAHU system configuration and test code) may start at an address 3.

In first scenario 401, last known-good system configuration 411 and system configuration temporary staging area 412 may be stored in the same NVRAM, which may be either an embedded NVRAM 442 or an external NVRAM 444.

In second scenario 402, last known-good system configuration 411 and system configuration temporary staging area 412 may be stored in different NVRAMs. An NVRAM storing last known-good system configuration 411 may be either an embedded NVRAM 442 or an external NVRAM 444. Similarly, an NVRAM storing system configuration temporary staging area 412 may be either an embedded NVRAM 442 or an external NVRAM 444.

First scenario 401 and/or second scenario 402 may incorporate NVRAM either embedded or mounted as an external chiplet, so long as address 1, address 2 and address 3 are defined properly. Address 1 may be hardcoded in an OTAHU controller. Address 2 and/or address 3 may be stored in OTP memory 450, or may be hard coded.

Figure 5A:
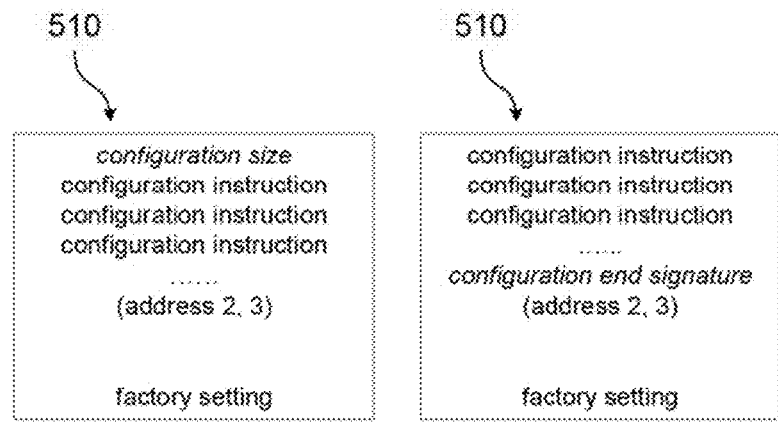
FIGS. 5A-5C illustrates storage of system configurations in memory systems, in accordance with some embodiments of the disclosure.
Figure 5B:
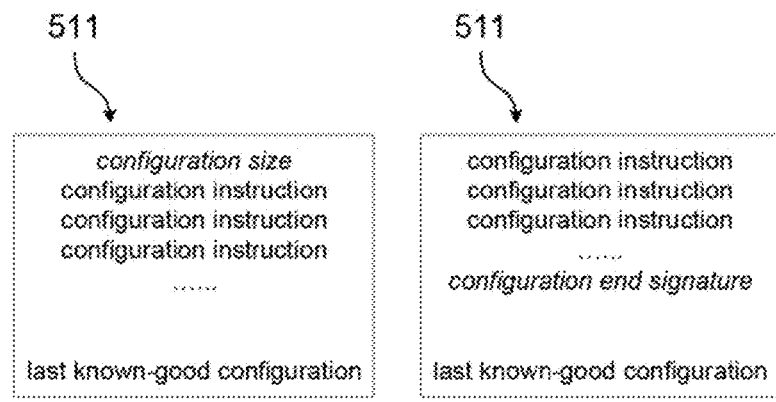
Figure 5C:
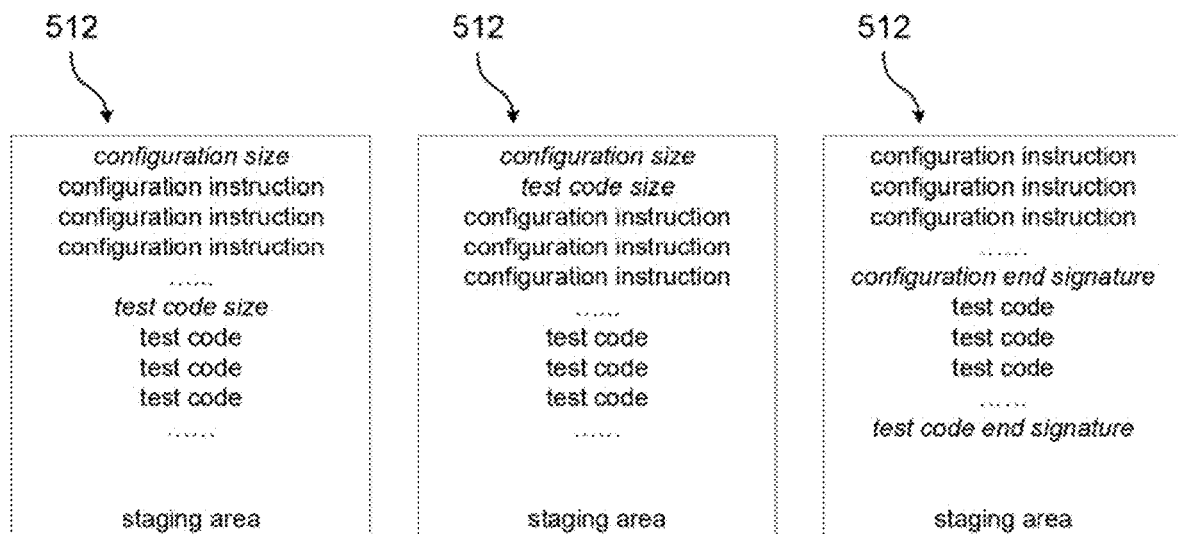

FIGS. 5A-5C illustrates storage of system configurations in memory systems, in accordance with some embodiments of the disclosure. FIG. 5A depicts embodiments of contents of a factory-setting system configuration 510. In some embodiments, factory-setting system configuration 510 may provide to an OTAHU controller an indicator of a size of a configuration dataset (e.g., a set of configuration instructions). For some embodiments, factory-setting system configuration 510 may provide to the OTAHU controller an indicator of the end of the configuration dataset. In some applications, address 2 and/or address 3 may also be stored in factory-setting system configuration 510.

FIG. 5B depicts embodiments of contents of a last known-good system configuration 511. In some embodiments, last known-good system configuration 511 may provide to an OTAHU controller an indicator of a size of a configuration dataset. For some embodiments, last known-good system configuration 511 may provide to the OTAHU controller an indicator of the end of the configuration dataset.

FIG. 5C depicts embodiments of a system configuration temporary staging area 512, which may comprise both system configuration instructions and test code. In some embodiments, system configuration temporary staging area 512 may provide to an OTAHU controller an indicator of a size of a configuration dataset, followed by the configuration dataset, followed by an indicator of a size of a set of test code, followed by the set of test code. For some embodiments, system configuration temporary staging area 512 may provide to an OTAHU controller an indicator of a size of a configuration dataset, followed by an indicator of a size of a set of test code, followed by the configuration dataset, followed by the set of test code. In some embodiments, system configuration temporary staging area 512 may provide to an OTAHU controller a configuration dataset, an indicator of the end of the configuration dataset, followed by a set of test code, followed by an indicator of the end of the set of test code.

Figure 6:
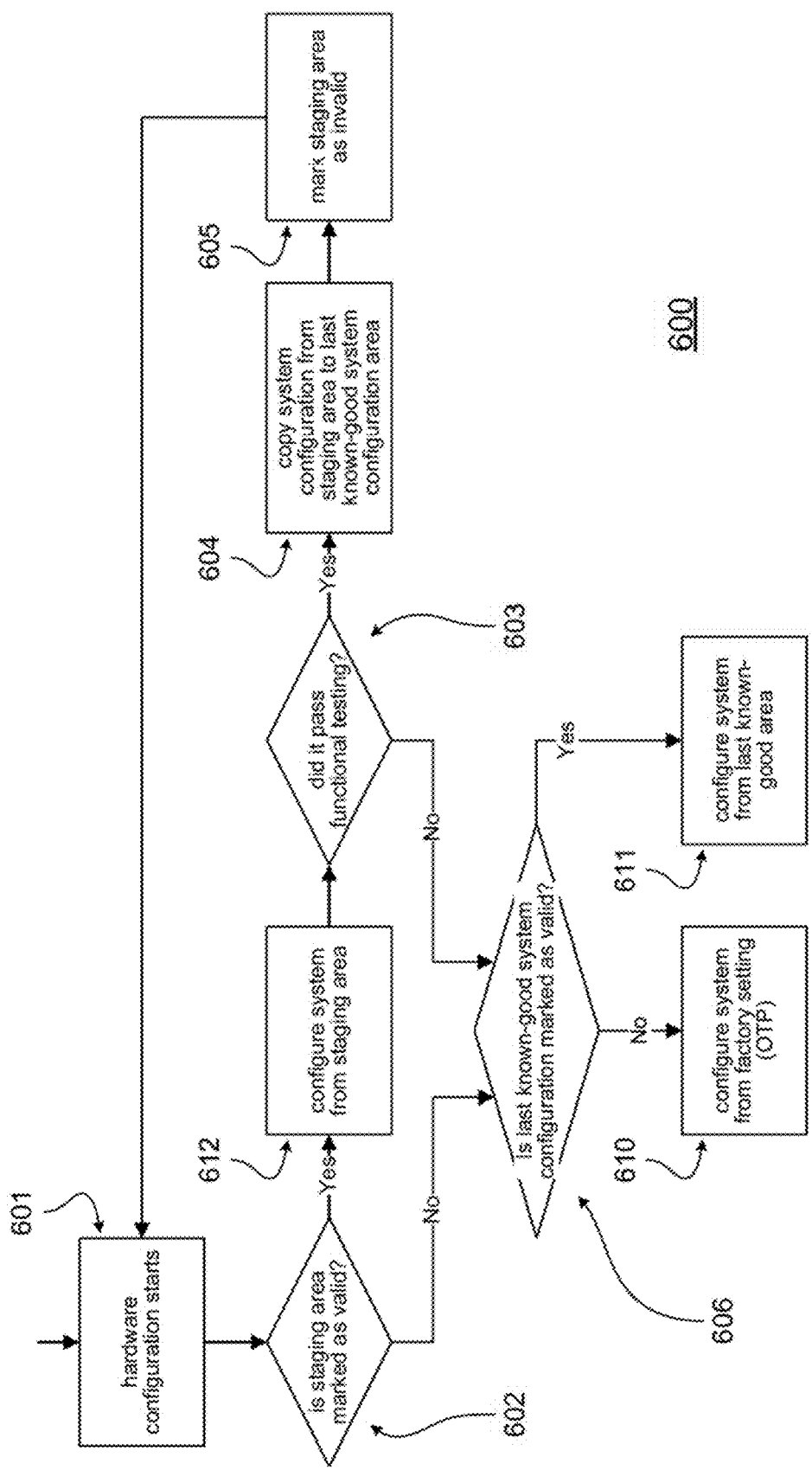
FIG. 6 illustrates a hardware configuration sequence at boot time, in accordance with some embodiments of the disclosure.

FIG. 6 illustrates a hardware configuration sequence at boot time, in accordance with some embodiments of the disclosure. A sequence 600 may comprise an action 601 in which hardware configuration may start (e.g., as part of a boot sequence). In a test 602, an OTAHU controller may test whether a system configuration temporary staging area is marked as valid. If it is, then in an action 612, the OTAHU controller may program a silicon interposer with configuration instructions in the system configuration temporary staging area. In a test 603, one or more functional tests may be executed. The functional tests may be software-controlled, and may be executed by a CPU or by a controller. If the functional testing of test 603 passes, in an action 604, the contents of the system configuration temporary staging area may be copied to a last known-good system configuration area, the system configuration temporary staging area may be marked as invalid for booting, and the last known-good system configuration area may be marked as valid for system configuration. A reboot may follow a successful OTAHU update.

If the functional testing of test 603 fails, the contents of the system configuration temporary staging area may be discarded and/or may be marked as invalid. Either an invalid staging area mark or connectivity test failure may trigger the OTAHU controller to check if the last known-good system configuration area is valid for system configuration. If the last known-good system configuration area is marked as valid, the OTAHU controller may program the silicon interposer with configuration instructions in the last known-good system configuration area. Otherwise, the OTAHU controller may program the silicon interposer with configuration instructions in the factory-setting system configuration area.

Figure 7:
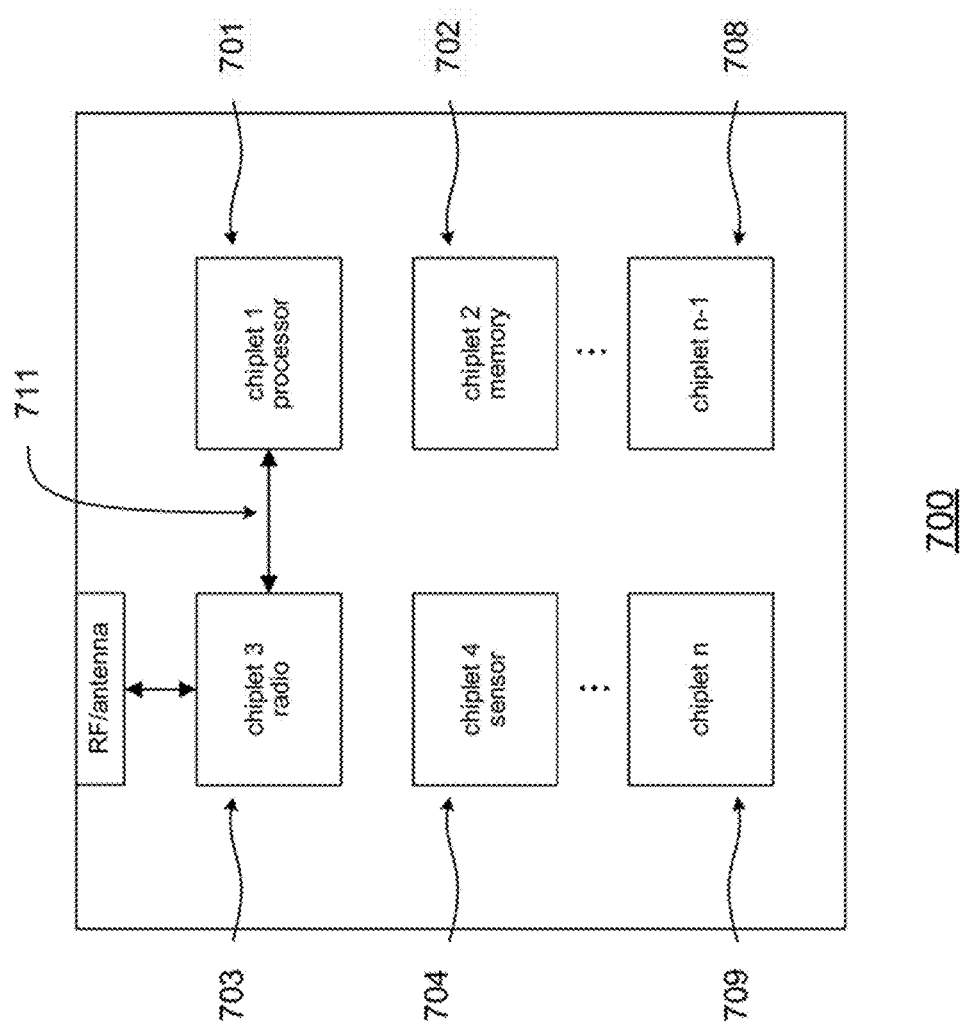
FIG. 7 illustrates a system using a silicon interposer as assembled at the time of manufacture, in accordance with some embodiments of the disclosure.

FIG. 7 illustrates a system using a silicon interposer as assembled at the time of manufacture, in accordance with some embodiments of the disclosure. A silicon interposer 700 may have a first chiplet 701 comprising a processor, a second chiplet 702 comprising a memory, a third chiplet 703 comprising a radio circuitry, a fourth chiplet 704 comprising a sensor, and so on, up to an n−1 chiplet 708 and an nth chiplet 709. Silicon interposer 700 may incorporate OTAHU mechanisms, which may establish a factory-setting system configuration in which an antenna, a radio circuitry (e.g., in third chiplet 703), and a processor (e.g., in first chiplet 701) may be interconnected by a set of busses 711.

The various chiplets may include components that may provide additional functionality at a later time (in accordance with, for example, a customer order). These chiplets may be mounted on silicon interposer 700, but might not be configured as a part of the system as part of a factory's manufacturing process. Instead, the interconnection of additional chiplets may occur after the customer places an order for the desired function or functions.

Figure 8:
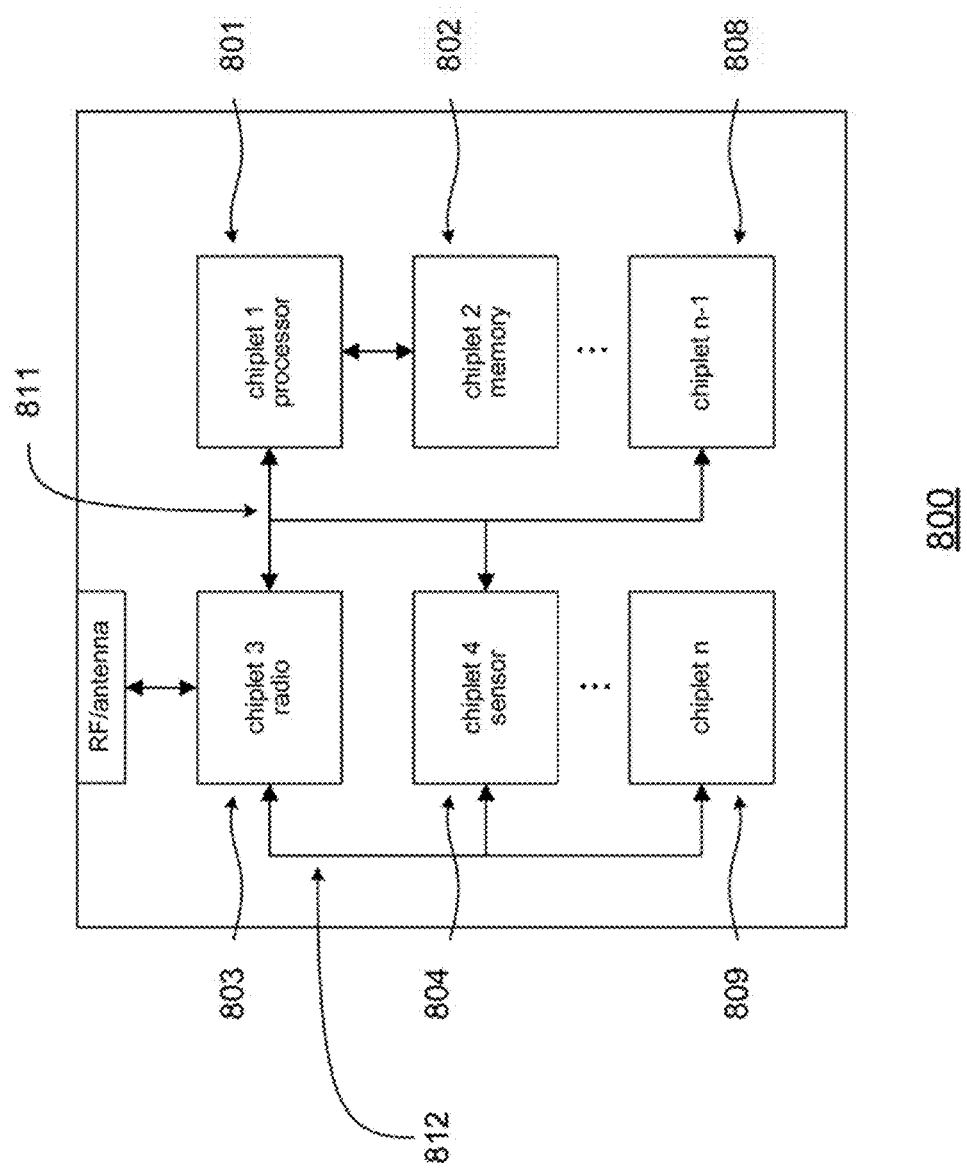
FIG. 8 illustrates a system using a silicon interposer as re-configured through OTAHU, in accordance with some embodiments of the disclosure.

FIG. 8 illustrates a system using a silicon interposer as re-configured through OTAHU, in accordance with some embodiments of the disclosure. A silicon interposer 800 may have a first chiplet 801 comprising a processor, a second chiplet 802 comprising a memory, a third chiplet 803 comprising a radio circuitry, a fourth chiplet 804 comprising a sensor, and so on, up to an n−1 chiplet 808 and an nth chiplet 809. Silicon interposer 800 may incorporate OTAHU mechanisms, which may establish a last known-good system configuration in which an antenna, a radio circuitry (e.g., in third chiplet 803), a processor (e.g., in first chiplet 801), and a component in n−1 chiplet 808 may be interconnected by a first set of busses 811, and the radio circuitry, a sensor (e.g., in fourth chiplet 804), and nth chiplet 809 may be interconnected by a second set of busses 812.

A connectivity of silicon interposer 800 may accordingly be re-programmed and quickly customized after a factory's manufacturing process to the last known-good system configuration—for example, by an OTA hardware update—which may override a factory-setting system configuration. If a customer decides at a later time to interconnect any of the various components in an alternate manner, another OTA hardware update may be performed to implement the alternate interconnection.

OTAHU mechanisms and methods may accordingly provide system developer flexibility for system configuration. In addition, for embodiments incorporating an embedded NVRAM, all system connectivity information may be erased when the power to the system is turned off, which may advantageously enhance security for the customer's IP. The embedded NVRAM may accordingly increase the difficulty of brute-force reverse engineering and/or hacking.

Figure 9:
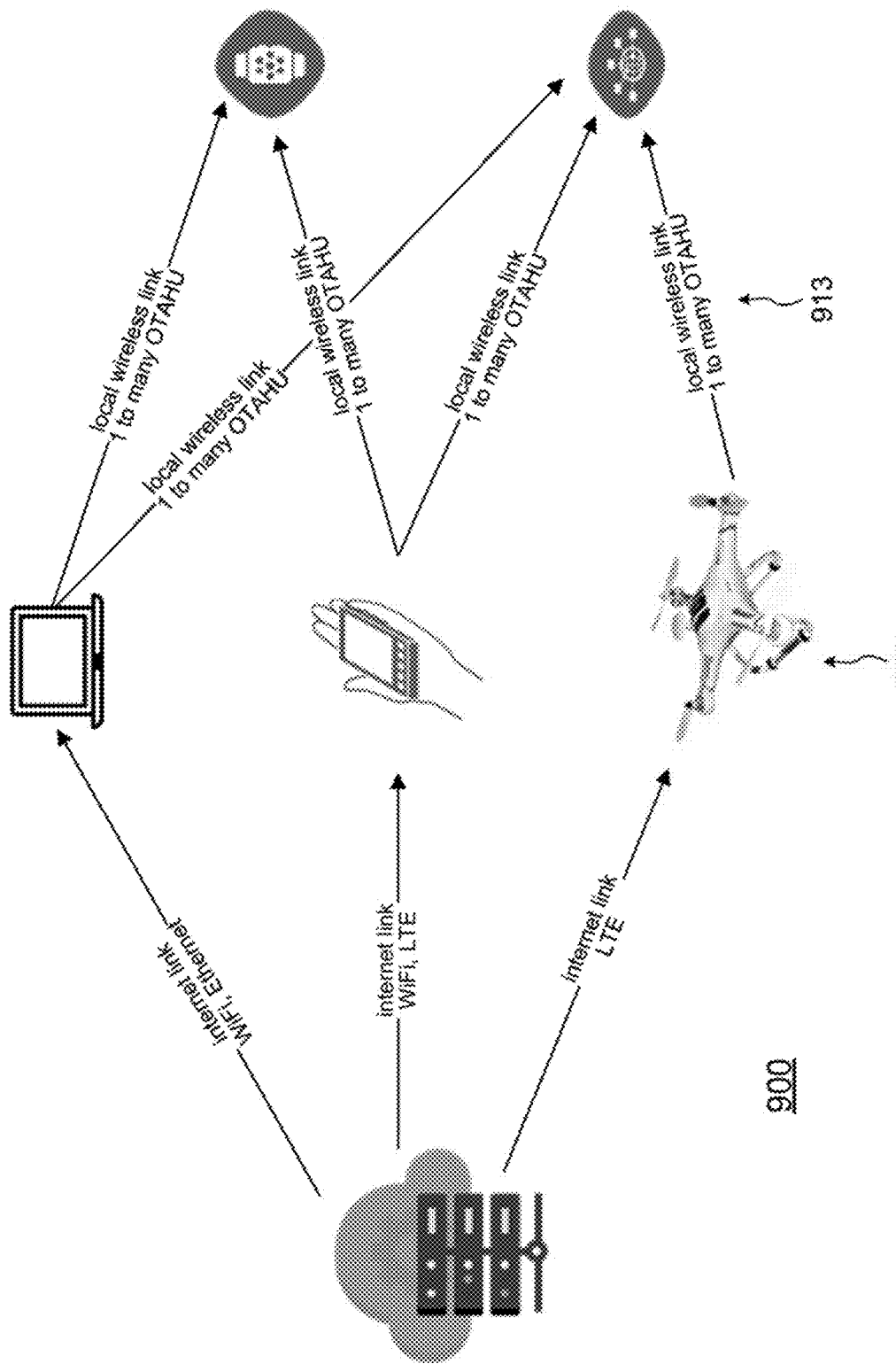
FIG. 9 illustrates data flow in a hardware OTAHU update, in accordance with some embodiments of the disclosure.

FIG. 9 illustrates data flow in a hardware OTAHU update, in accordance with some embodiments of the disclosure. In a scenario 900, a configuration program may be facilitated by internet cloud connectivity. Configuration data may be downloaded to various master devices 912, which may include one or more computers, one or more mobile phones, and/or one or more IoT devices. The configuration program may then be transferred to various slave devices 913, which may include one or more IoT devices and/or one or more wearable devices. Master devices 912 may incorporate radios to broadcast configuration data, and as a result, many slave devices 913 may download configuration data concurrently from a single master device 912, and one master device can program many slave devices concurrently. This may significantly reduce a total time for OTAHU updates, and may reduce production costs by advantageously facilitating wireless programming of many devices in parallel.

Figure 10:
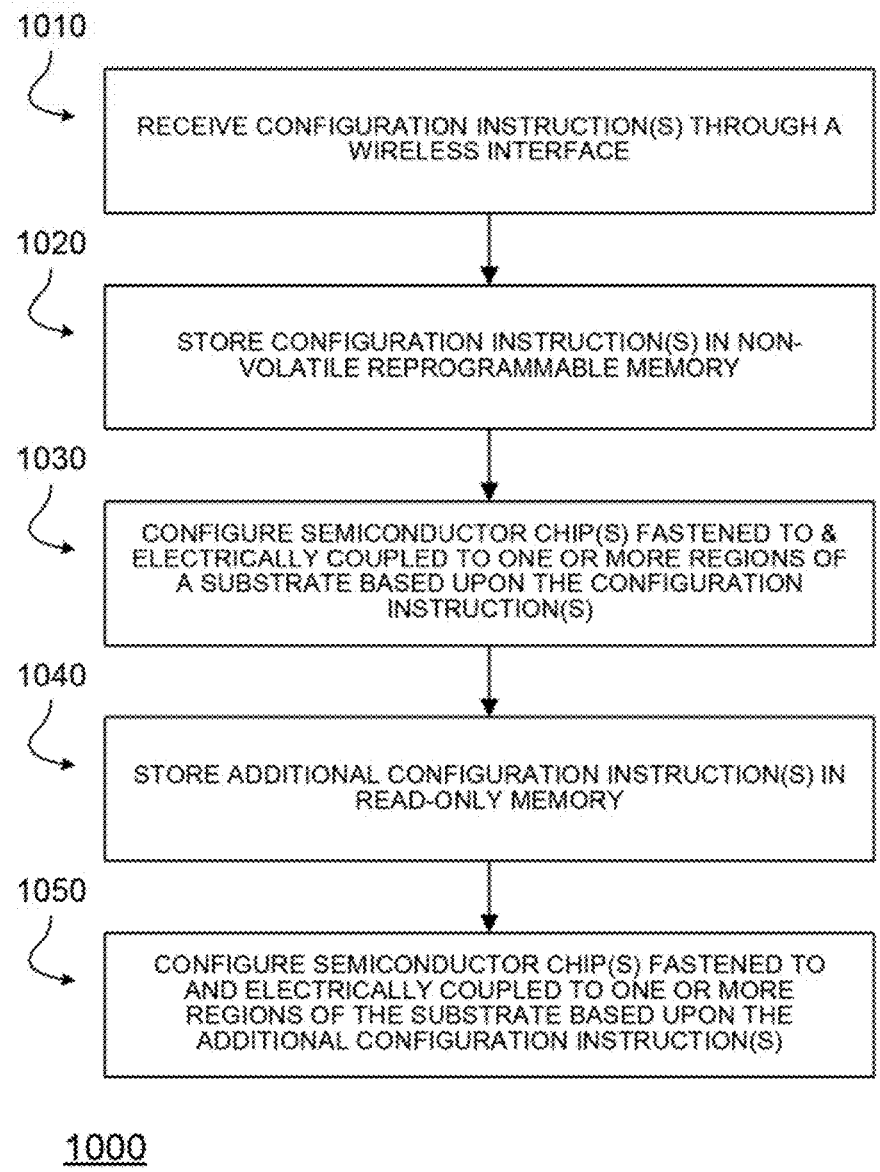
FIG. 10 illustrates methods for OTAHU, in accordance with some embodiments of the disclosure.

FIG. 10 illustrates methods for OTAHU, in accordance with some embodiments of the disclosure. A method 1000 may comprise a receiving 1010, a storing 1020, and a configuring 1030. Method 1000 may also comprise a storing 1040 and/or a configuring 1050.

In receiving 1010, a set of configuration instructions may be received through a wireless interface of an apparatus. In storing 1020, the set of configuration instructions may be stored in a non-volatile reprogrammable memory of the apparatus. In configuring 1030, one or more semiconductor dies fastened to and electrically coupled to one or more regions of a substrate of the apparatus may be configured based upon the set of configuration instructions.

In some embodiments, in storing 1040, an additional set of configuration instructions may be stored in a read-only memory of the apparatus. For some embodiments, in configuration 1050, one or more semiconductor dies fastened to and electrically coupled to the one or more regions of a substrate of the apparatus may be configured based upon the additional set of configuration instructions.

For some embodiments, the one or more semiconductor dies may comprise the non-volatile reprogrammable memory and/or the wireless interface of the apparatus. In some embodiments, the set of wirelessly-received configuration instructions may include a size indicator and/or an end indicator.

Figure 11:
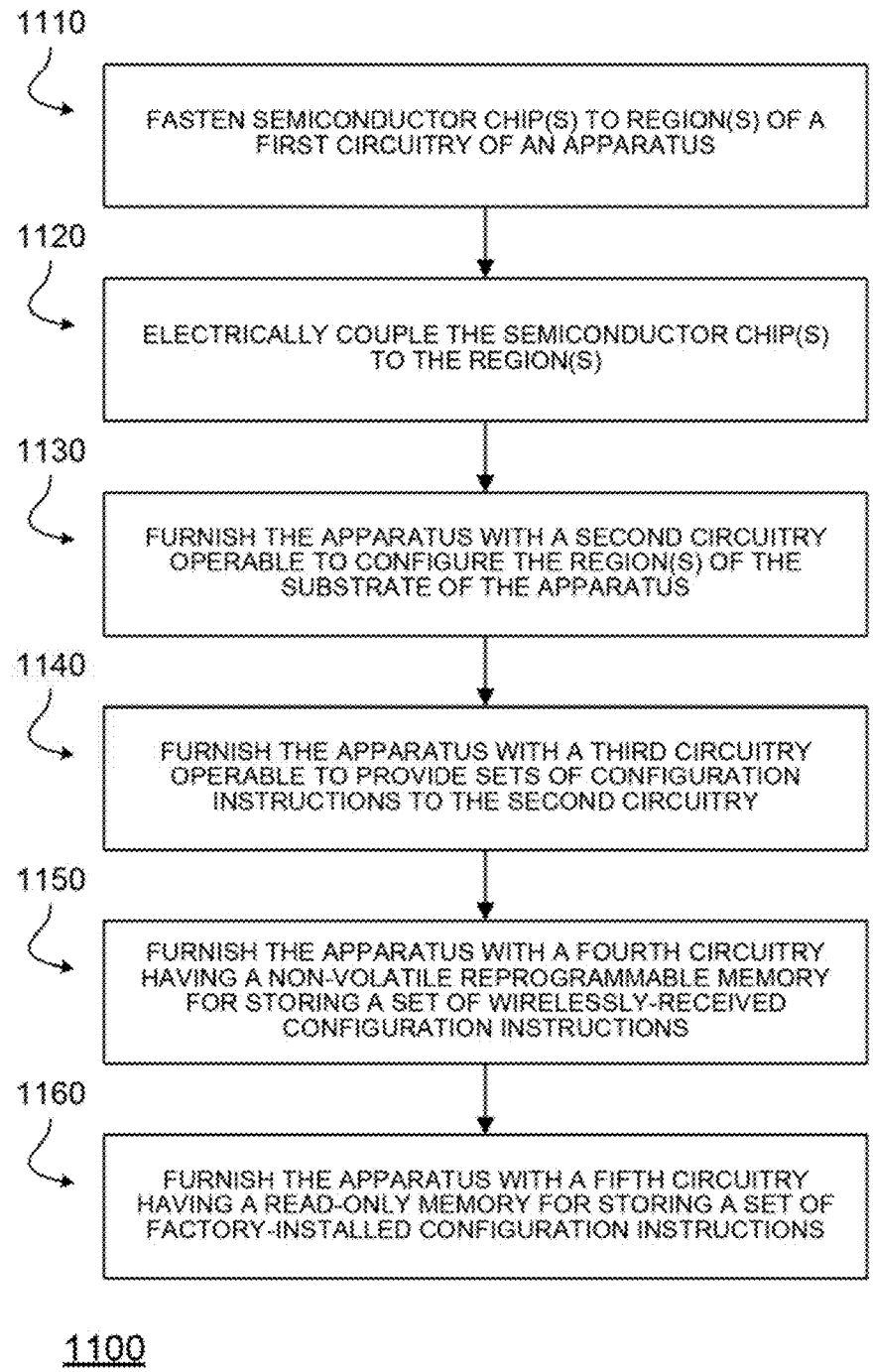
FIG. 11 illustrates methods of manufacturing an OTAHU apparatus, in accordance with some embodiments of the disclosure.

FIG. 11 illustrates methods of manufacturing an OTAHU apparatus, in accordance with some embodiments of the disclosure. A method of manufacturing 1100 may comprise a fastening 1110, a coupling 1120, a furnishing 1130, a furnishing 1140, and a furnishing 1150. Method of manufacturing 1100 may also comprise a furnishing 1160.

In fastening 1110, one or more semiconductor dies may be fastened to one or more respectively corresponding regions of a first circuitry of an apparatus. In coupling 1120, the one or more semiconductor dies may be electrically coupled to the one or more regions. In furnishing 1130, the apparatus may be furnished with a second circuitry operable to configure the one or more regions. In furnishing 1140, the apparatus may be furnished with a third circuitry operable to provide sets of configuration instructions to the second circuitry. In furnishing 1150, the apparatus may be furnished with a fourth circuitry having a non-volatile reprogrammable memory for storing a set of wirelessly-received configuration instructions. The fourth circuitry may be operable to provide the set of wirelessly-received configuration instructions to the third circuitry.

In some embodiments, in furnishing 1160, the apparatus may be furnished with a fifth circuitry having a read-only memory for storing a set of factory-installed configuration instructions. The fifth circuitry may be operable to provide the additional set of configuration instructions to the third circuitry.

For some embodiments, the one or more semiconductor dies may comprise processor circuitry, a memory circuitry, the non-volatile reprogrammable memory, an antenna, and/or a radio circuitry. In some embodiments, the set of wirelessly-received configuration instructions may include a size indicator and/or an end indicator.

With reference to FIGS. 10 and 11, although the actions in the flowcharts are depicted as being in a particular order, the order of the actions can be modified. Thus, the illustrated actions may be performed in a different order, and some actions may be performed in parallel. Some of the actions and/or operations listed in FIGS. 10 and 11 may be optional in accordance with certain embodiments. The numbering of the actions presented is for the sake of clarity and is not intended to prescribe an order of operations in which the various actions must occur. Additionally, operations from the various flows may be utilized in a variety of combinations.

In some embodiments, an apparatus may comprise means for performing various actions and/or operations of the methods of FIG. 10.

Moreover, in some embodiments, machine readable storage media may have executable instructions that, when executed, cause one or more processors to perform an operation comprising method 1000. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

Figure 12:
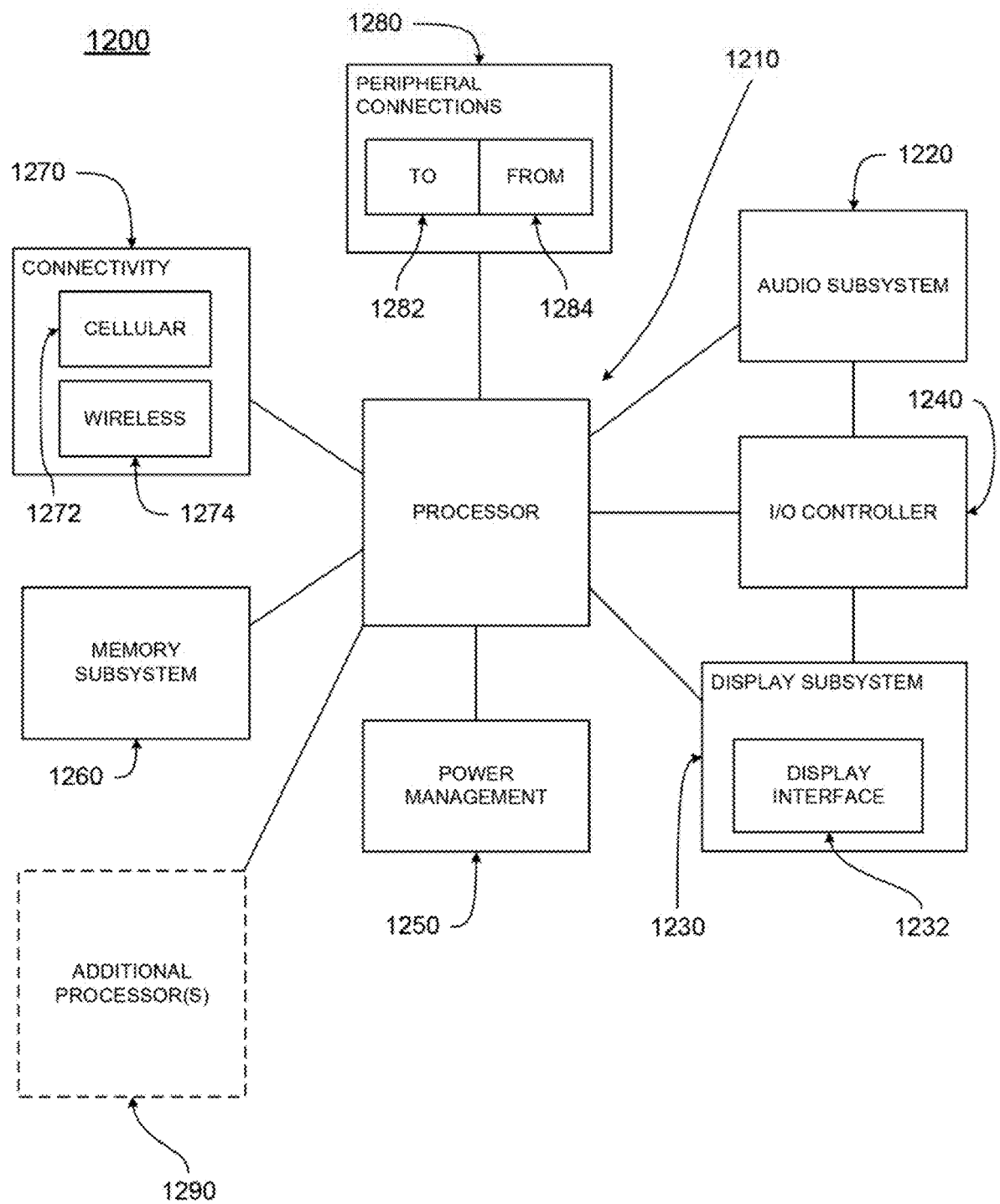
FIG. 12 illustrates a computing device with mechanisms for OTAHU, in accordance with some embodiments of the disclosure.

FIG. 12 illustrates a computing device with mechanisms for OTAHU, in accordance with some embodiments of the disclosure. Computing device 1200 may be a computer system, a System-on-a-Chip (SoC), a tablet, a mobile device, a smart device, a smart phone, an IoT device, or a wearable device with mechanisms for OTAHU, in accordance with some embodiments of the disclosure. It will be understood that certain components of computing device 1200 are shown generally, and not all components of such a device are shown in FIG. 12. Moreover, while some of the components may be physically separate, others may be integrated within the same physical package, or even on the same physical silicon die. Accordingly, the separation between the various components as depicted in FIG. 12 may not be physical in some cases, but may instead be a functional separation. It is also pointed out that those elements of FIG. 12 having the same names or reference numbers as the elements of any other figure can operate or function in any manner similar to that described, but are not limited to such.

In various embodiments, the components of computing device 1200 may include any of a processor 1210, an audio subsystem 1220, a display subsystem 1230, an I/O controller 1240, a power management component 1250, a memory subsystem 1260, a connectivity component 1270, one or more peripheral connections 1280, and one or more additional processors 1290. In some embodiments, processor 1210 may include mechanisms for OTAHU, in accordance with some embodiments of the disclosure. In various embodiments, however, any of the components of computing device 1200 may include mechanisms for OTAHU, in accordance with some embodiments of the disclosure. In addition, one or more components of computing device 1200 may include an interconnect fabric having a plurality of ports, such as a router, a network of routers, or a Network-on-a-Chip (NoC).

In some embodiments, computing device 1200 may be a mobile device which may be operable to use flat surface interface connectors. In one embodiment, computing device 1200 may be a mobile computing device, such as a computing tablet, a mobile phone or smart-phone, a wireless-enabled e-reader, an IoT device, a wearable device, or other wireless mobile device. The various embodiments of the present disclosure may also comprise a network interface within 1270 such as a wireless interface so that a system embodiment may be incorporated into a wireless device, for example a cell phone or personal digital assistant.

Processor 1210 may be a general-purpose processor or CPU (Central Processing Unit). In some embodiments, processor 1210 may include one or more physical devices, such as microprocessors, application processors, microcontrollers, programmable logic devices, or other processing means. The processing operations performed by processor 1210 may include the execution of an operating platform or operating system on which applications and/or device functions may then be executed. The processing operations may also include operations related to one or more of the following: audio I/O; display I/O; power management; connecting computing device 1200 to another device; and/or I/O (input/output) with a human user or with other devices.

Audio subsystem 1220 may include hardware components (e.g., audio hardware, audio circuits and/or codecs) and software components (e.g., drivers and/or codecs) associated with providing audio functions to computing device 1200. Audio functions can include speaker and/or headphone output as well as microphone input. Devices for such functions can be integrated into computing device 1200, or connected to computing device 1200. In one embodiment, a user interacts with computing device 1200 by providing audio commands that are received and processed by processor 1210.

Display subsystem 1230 may include hardware components (e.g., display devices) and software components (e.g., drivers) that provide a visual and/or tactile display for a user to interact with computing device 1200. Display subsystem 1230 may include a display interface 1232, which may be a particular screen or hardware device used to provide a display to a user. In one embodiment, display interface 1232 includes logic separate from processor 1210 to perform at least some processing related to the display. In some embodiments, display subsystem 1230 includes a touch screen (or touch pad) device that provides both output and input to a user.

I/O controller 1240 may include hardware devices and software components related to interaction with a user. I/O controller 1240 may be operable to manage hardware that is part of audio subsystem 1220 and/or display subsystem 1230. Additionally, I/O controller 1240 may be a connection point for additional devices that connect to computing device 1200, through which a user might interact with the system. For example, devices that can be attached to computing device 1200 might include microphone devices, speaker or stereo systems, video systems or other display devices, keyboard or keypad devices, or other I/O devices for use with specific applications such as card readers or other devices.

As mentioned above, I/O controller 1240 can interact with audio subsystem 1220 and/or display subsystem 1230. For example, input through a microphone or other audio device can provide input or commands for one or more applications or functions of computing device 1200. Additionally, audio output can be provided instead of, or in addition to, display output. In another example, if display subsystem 1230 includes a touch screen, the display device may also act as an input device, which can be at least partially managed by I/O controller 1240. There can also be additional buttons or switches on computing device 1200 to provide I/O functions managed by I/O controller 1240.

In some embodiments, I/O controller 1240 manages devices such as accelerometers, cameras, light sensors or other environmental sensors, or other hardware that can be included in computing device 1200. The input can be part of direct user interaction, and may provide environmental input to the system to influence its operations (such as filtering for noise, adjusting displays for brightness detection, applying a flash for a camera, or other features).

Power management component 1250 may include hardware components (e.g., power management devices and/or circuitry) and software components (e.g., drivers and/or firmware) associated with managing battery power usage, battery charging, and features related to power saving operation.

Memory subsystem 1260 may include one or more memory devices for storing information in computing device 1200. Memory subsystem 1260 can include nonvolatile memory devices (whose state does not change if power to the memory device is interrupted) and/or volatile memory devices (whose state is indeterminate if power to the memory device is interrupted). Memory subsystem 1260 can store application data, user data, music, photos, documents, or other data, as well as system data (whether long-term or temporary) related to the execution of the applications and functions of computing device 1200.

Some portion of memory subsystem 1260 may also be provided as a non-transitory machine-readable medium for storing the computer-executable instructions (e.g., instructions to implement any other processes discussed herein). The machine-readable medium may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, some embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity component 1270 may include a network interface, such as a cellular interface 1272 or a wireless interface 1274 (so that an embodiment of computing device 1200 may be incorporated into a wireless device such as a cellular phone or a personal digital assistant). In some embodiments, connectivity component 1270 includes hardware devices (e.g., wireless and/or wired connectors and communication hardware) and software components (e.g., drivers and/or protocol stacks) to enable computing device 1200 to communicate with external devices. Computing device 1200 could include separate devices, such as other computing devices, wireless access points or base stations, as well as peripherals such as headsets, printers, or other devices.

In some embodiments, connectivity component 1270 can include multiple different types of network interfaces, such as one or more wireless interfaces for allowing processor 1210 to communicate with another device. To generalize, computing device 1200 is illustrated with cellular interface 1272 and wireless interface 1274. Cellular interface 1272 refers generally to wireless interfaces to cellular networks provided by cellular network carriers, such as provided via GSM or variations or derivatives, CDMA (code division multiple access) or variations or derivatives, TDM (time division multiplexing) or variations or derivatives, NB-IoT or variations or derivatives, or other cellular service standards. Wireless interface 1274 refers generally to non-cellular wireless interfaces, and can include personal area networks (such as Bluetooth, Near Field, etc.), local area networks (such as Wi-Fi), and/or wide area networks (such as WiMax), or other wireless communication.

Peripheral connections 1280 may include hardware interfaces and connectors, as well as software components (e.g., drivers and/or protocol stacks) to make peripheral connections. It will be understood that computing device 1200 could both be a peripheral device to other computing devices (via "to" 1282), as well as have peripheral devices connected to it (via "from" 1284). The computing device 1200 may have a "docking" connector to connect to other computing devices for purposes such as managing content on computing device 1200 (e.g., downloading and/or uploading, changing, synchronizing). Additionally, a docking connector can allow computing device 1200 to connect to certain peripherals that allow computing device 1200 to control content output, for example, to audiovisual or other systems.

In addition to a proprietary docking connector or other proprietary connection hardware, computing device 1200 can make peripheral connections 1280 via common or standards-based connectors. Common types of connectors can include a Universal Serial Bus (USB) connector (which can include any of a number of different hardware interfaces), a DisplayPort or MiniDisplayPort (MDP) connector, a High Definition Multimedia Interface (HDMI) connector, a Firewire connector, or other types of connectors.

It is pointed out that elements of any of the Figures herein having the same reference numbers and/or names as elements of any other Figure herein may, in various embodiments, operate or function in a manner similar those elements of the other Figure (without being limited to operating or functioning in such a manner).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a first circuitry operable to be fastened and electrically coupled in one or more regions to one or more respectively corresponding semiconductor dies;
a second circuitry operable to configure the one or more regions of the first circuitry;
a third circuitry having an interface to an antenna and being operable to provide a set of wirelessly-received configuration instructions to the second circuitry;
a non-volatile memory to store the set of wirelessly-received configuration instructions, wherein the non-volatile memory is configured to store an end indicator;
a self-test circuitry configured to test a circuit, wherein the self-test circuitry is coupled to the one or more regions, wherein the first circuitry, the second circuitry, the third circuitry, and the self-test circuitry are embedded in a programmable silicon interposer;
a fabric controller circuitry, an TO controller circuitry, and a power management circuitry, wherein the fabric controller circuitry, the TO controller circuitry, and the power management circuitry are embedded in the programmable silicon interposer and coupled to the one or more regions; and
a fifth circuitry having a read-only memory configured to store a set of factory-installed configuration instructions, the fifth circuitry being operable to provide the set of factory-installed configuration instructions to the third circuitry.

2. The apparatus of claim 1, comprising:
one or more semiconductor dies fastened and electrically connected to the one or more regions.

3. The apparatus of claim 2,
wherein the one or more semiconductor dies include at least one of: a processor circuitry, a memory circuitry, or a radio circuitry.

4. The apparatus of claim 1,
comprising:
a fourth circuitry having the non-volatile memory for storing the set of wirelessly-received configuration instructions, the fourth circuitry being operable to provide the set of wirelessly-received configuration instructions to the third circuitry.

5. The apparatus of claim 4,
wherein a semiconductor die fastened and electrically connected to one of the one or more regions comprises the fourth circuitry.

6. The apparatus of claim 1,
comprising:
the antenna coupled to the third circuitry and operable to receive the set of wirelessly-received configuration instructions.

7. The apparatus of claim 1, wherein the one or more respectively corresponding semiconductor dies include a radio circuitry with a Bluetooth Low Energy Channel which is configured to receive instructions for the programmable silicon interposer.

8. The apparatus of claim 1, wherein the non-volatile memory stores a configuration that pertains to connections that enable to test the circuit.

9. The apparatus of claim 1, wherein the non-volatile memory is to store configuration instructions that pertain to connections that enable a most recent verified or validated system configuration.

10. The apparatus of claim 1, wherein the non-volatile memory is encrypted.

11. The apparatus of claim 1, wherein:
the non-volatile memory is configured to store a last known-good system configuration that contains configuration instructions pertaining to connections enabling a most recent verified and/or validated system configuration; and
the non-volatile memory includes an area configured to store configuration instructions pertaining to connections enabling a configuration still under test, wherein the area is marked valid after an over-the-air update, wherein a subsequent reboot of the apparatus continues a test based on the configuration instructions stored in the area.

12. The apparatus of claim 11, wherein the set of factory-installed configuration instructions start at a first address, wherein the set of factory-installed configuration instructions are configuration instructions installed at product manufacturing time, wherein the last known-good system configuration starts at a second address, wherein the configuration instructions pertaining to connections enabling the configuration still under test starts at a third address, wherein the first address is hardcoded in a memory controller.

13. The apparatus of claim 12, wherein the memory controller is coupled to the non-volatile memory and the fifth circuitry.

14. The apparatus of claim 12, wherein:
the set of factory-installed configuration instructions are configured to provide a first indicator to the memory controller about an end of the set of factory-installed configuration instructions;
the last known-good system configuration is configured to provide a second indicator to the memory controller about an end of the last known-good system configuration; and
the configuration instructions that pertain to connections that enable the configuration still under test are configured to provide a third indicator to them memory controller, wherein the third indicator indicates a size of the configuration instructions followed by a fourth indicator that indicates a size of a test code, followed by the test code.

15. An apparatus comprising:
a first circuitry operable to be mounted against one or more semiconductor dies in one or more respectively corresponding regions;
a second circuitry operable to configure at least one of the one or more respectively corresponding regions of the first circuitry;
a third circuitry operable to provide a set of configuration instructions to the second circuitry;
a fourth circuitry having a non-volatile reprogrammable memory for storing the set of configuration instructions, wherein the non-volatile reprogrammable memory is configured to store an end indicator;
a self-test circuitry configured to test a circuit, wherein the self-test circuitry is coupled to the one or more respectively corresponding regions;
an interface operable to receive the set of configuration instructions from a radio circuitry; and
a fabric controller circuitry, an TO controller circuitry, and a power management circuitry, wherein the fabric controller circuitry, the TO controller circuitry, and the power management circuitry are embedded in a programmable silicon interposer and coupled to the one or more respectively corresponding regions,
wherein the first circuitry, the second circuitry, the third circuitry, the fourth circuitry, the self-test circuitry, and the interface are embedded in the programmable silicon interposer.

16. The apparatus of claim 15, comprising:
the one or more semiconductor dies mounted against the one or more respectively corresponding regions.

17. The apparatus of claim 16,
wherein the one or more semiconductor dies include at least one of: a processor circuitry, a memory circuitry, or the radio circuitry.

18. The apparatus of claim 15,
wherein a semiconductor die mounted against one of the one or more respectively corresponding regions comprises the fourth circuitry.

19. The apparatus of claim 15, comprising:
a fifth circuitry having a read-only memory for storing a set of factory-installed configuration instructions.

20. A system comprising a memory, a processor coupled to the memory, a wireless interface for allowing the system to communicate with another device, and an apparatus including:
a first circuitry operable to be fastened and electrically coupled in one or more regions to one or more respectively corresponding semiconductor dies;
a second circuitry operable to configure the one or more regions of the first circuitry;
a third circuitry operable to provide a set of wirelessly-received configuration instructions to the second circuitry;
a non-volatile memory to store the set of wirelessly-received configuration instructions, wherein the non-volatile memory is configured to store an end indicator;
a self-test circuitry configured to test a circuit, wherein the self-test circuitry is coupled to the one or more regions, wherein the first circuitry, the second circuitry, the third circuitry, and the self-test circuitry are embedded in a programmable silicon interposer; and
a fabric controller circuitry, an IO controller circuitry, and a power management circuitry, wherein the fabric controller circuitry, the IO controller circuitry, and the power management circuitry are embedded in the programmable silicon interposer and coupled to the one or more regions.

21. The system of claim 20, comprising:
one or more semiconductor dies fastened and electrically connected to the one or more regions,
wherein the one or more semiconductor dies include at least one of: the processor, the memory, or the wireless interface.

22. The system of claim 20, comprising:
a fourth circuitry having the non-volatile memory for storing the set of wirelessly-received configuration instructions, the fourth circuitry being operable to provide the set of wirelessly-received configuration instructions to the third circuitry.

23. The system of claim 20, comprising:
a fifth circuitry having a read-only memory for storing a set of factory-installed configuration instructions, the fifth circuitry being operable to provide the set of factory-installed configuration instructions to the third circuitry.

\* \* \* \* \*